United States Patent [19]

Tanaka et al.

[11] Patent Number: 5,666,302

[45] Date of Patent: Sep. 9, 1997

[54] SIMULTANEOUS BIDIRECTIONAL TRANSMISSION APPARATUS FOR TRANSMITTING AND RECEIVING DIFFERENTIAL SIGNALS

[75] Inventors: Akira Tanaka, Isehara; Kenichi Ishibashi, Kokubunji; Akira Yamagiwa, Oiso; Takehisa Hayashi, Sagamihara, all of Japan

[73] Assignee: Hitachi, Ltd., Tokyo, Japan

[21] Appl. No.: 496,195

[22] Filed: Jun. 28, 1995

[30] Foreign Application Priority Data

Jul. 6, 1994 [JP] Japan .................. 6-154379

[51] Int. Cl.$^6$ ...................................... G06G 7/02
[52] U.S. Cl. ............................................ 364/825
[58] Field of Search ........................ 364/825, 607, 364/724.01

[56] References Cited

U.S. PATENT DOCUMENTS 3,624,562  11/1971  Fujimura ................. 364/825 X
3,883,727  5/1975  Stuart et al. .......... 364/724.01 X
5,268,847  12/1993  Potetz et al. ............... 364/607

FOREIGN PATENT DOCUMENTS

47-11702  10/1972  Japan .

Primary Examiner—Tan V. Mai
Attorney, Agent, or Firm—Fay, Sharpe, Beall, Fagan, Minnich & McKee

[57] ABSTRACT

A simultaneous bidirectional transmission apparatus for transmitting and receiving differential signals solves a generation of pulse noise problem in the receiving circuit due to the inversion of the output of the transmission circuit. For a pair of input/output devices connected together by transmission lines, each input/output device has a differential transmitting circuit, a differential receiving circuit and six resistors. The output of the transmitting circuit does not affect an input to the receiving circuit, and the receiving circuit receives only the output of the transmitting circuit of the other input/output device. The resistors, a passive element circuit and the output resistance of the transmitting circuit form, in combination, a waveform shaping filter and a matching terminating circuit.

9 Claims, 4 Drawing Sheets

| TRANSMITTING DATA | | CONNECTION STATE | RECEIVING DATA | |
|---|---|---|---|---|
| 12a | 12b | | 21a | 21b |
| HIGTH | LOW | NORMAL OP. | LOW | HIGTH |
| | | TROUBLE GENE. | HIGTH | LOW |

SIMULTANEOUS BIDIRECTIONAL TRANSMISSION APPARATUS FOR TRANSMITTING AND RECEIVING DIFFERENTIAL SIGNALS

BACKGROUND OF THE INVENTION

1. Field of the Invention

The present invention relates to an input/output device and, more specifically, to an input/output device for use in combination with an electronic computer or a communications apparatus for the simultaneous bidirectional exchange of differential signals between a plurality of input/output devices.

2. Description of the Prior Art

A simultaneous bidirectional transmission apparatus for transmitting and receiving differential signals disclosed in Japanese Patent Laid-open (Kokai) No. 7-11702 is intended principally for reducing the number of necessary transmission lines to half the number of necessary transmission lines of a conventional unilateral input/output device having the same transmission rate, and for preventing the action of the output of a transmitting circuit on the input of a receiving circuit due to a sneak current only by the division of signal potential by a small-scale resistance circuit to receive a signal sent out through the other input/output device.

This known simultaneous bidirectional transmission apparatus is provided with input/output devices each having matching termination resistors at the opposite ends, respectively, of each of a first and a second transmission line for transmitting differential signals. Each input/output device has a transmitting circuit provided with a first and a second output terminal. The first and the second output terminal are connected through the matching termination resistors to the first and the second transmission lines, respectively, to apply transmitted differential signals to the first and the second transmission lines. Each input/output device is provided with a differential receiving circuit having an inverting input terminal and a noninverting input terminal to receive signals transmitted through the transmission lines by the other input/output device. A potential dividing resistor is connected across the first output terminal of the transmission line and the second transmission line to apply the divided potential to the noninverting input terminal of the receiving circuit. The resistances of the potential dividing resistors must be far greater than those of the matching termination resistors. The potential dividing resistors and the matching termination resistors of this known input/output device prevent the reception of of the output of the transmitting circuit as a differential signal between the inverting input terminal and the noninverting input terminal of its own receiving circuit, and at least part of a signal transmitted thereto through the transmission line by the other input/output device at the inverting input terminal and the noninverting input terminal of the receiving circuit.

The inventors of the present invention found that this prior art input/output device has the following three drawbacks in carrying out high-rate simultaneous bidirectional transmission.

First, in this input/output device, the median potential between the first and the second output, which are differential complementary outputs, of its own transmitting circuit, i.e., the median potential between the HIGH output and the LOW output, directly to the inverting input terminal and the noninverting input terminal of the receiving circuit in addition to the input signal from the other input/output device. Consequently, when the output of the transmitting circuit is inverted, the signal applied to its inverting input terminal and the noninverting input terminal of its receiving circuit is affected unless the first and the second output are inverted simultaneously when the output of the transmitting circuit is inverted. This drawback may be ignored when transmission rate is very low. However, recent advanced differential transmitting circuits, such as CMOS units or TTL units, which are widely used in the transmitting circuit of a high-speed transmission apparatus, form the first output unit and the second output unit of the transmitting circuit independently. Therefore, the first and the second output differ from each other in output inversion start time and time necessary for output inversion. If this prior art input/output device having such a drawback is applied to high-speed transmission, pulse noise appears on the inverting input terminal and the noninverting input terminal of the receiving circuit when the first and the second output of the transmitting circuit are inverted. Although the pulse noise, in principle, is common mode noise, practically, part of the pulse noise changes into normal noise to reduce the noise margin of the input/output device because the receiving circuit is unable to remove the noise thoroughly. If pulse noise appears when inverting the received signal, jitter in the receiving circuit becomes greater.

Secondly, in this prior art input/output device, the resistance of the potential dividing resistor connected to the input terminal of the receiving circuit must be very large as compared with the resistances of the matching termination resistors and, consequently, the current applied to the inverting input terminal and the noninverting input terminal of the receiving circuit is unavoidably very small. Therefore, if the input unit of the receiving circuit has a large parasitic capacitance, the waveform of the received signal becomes dull when inverted to make high-speed signal transmission difficult. Generally, the inverting input terminal and the noninverting input terminal of the input unit of a commercial standard receiving circuit, such as RS-422, are connected through resistors to a ground potential and a supply potential, respectively, to protect the receiving circuit. Therefore, the dc potential of the protective circuit is superposed on the received signal to cause amplitude reduction or jitter enhancement when the input/output device is provided with such a receiving circuit.

Thirdly, although the output resistance of the transmitting circuit is ignored in the prior art input/output device, practically, the transmitting circuit has an output resistance. Therefore, the amplitude of the differential output of the transmitting circuit varies according to the combination of sending signals given to the input/output devices connected to the opposite ends of the transmission line, respectively. When the combination of sending signal given to the input/output devices is a combination of HIGH and HIGH or a combination of LOW and LOW, there is no potential difference between the opposite ends of the transmission line and hence no current flows through the transmission line, and the differential output has a maximum amplitude because a voltage drop due to the output resistance of the transmitting circuit is a minimum. When the combination of the sending signals is a combination of HIGH and LOW or a combination of LOW and HIGH, a current flows through the transmission line due to the potential difference between the opposite ends of the transmission line, and the amplitude of the differential output become a minimum because the voltage drop due to the output resistance of the transmitting circuit is a maximum. Although the operating speed of transmitting circuits comprising CMOS circuits or TTL circuits has been progressively increased in recent years, it is difficult to employ a transmitting circuit comprising CMOS circuits or TTL circuits for high-speed transmission because the output resistance of such a transmitting circuit is large as compared with that of ECL circuits.

SUMMARY OF THE INVENTION

Accordingly, it is a first object of the present invention to provide an input/output device having a transmitting circuit and a receiving circuit, and capable of reducing pulse noise that sneaks from the transmitting circuit into the receiving circuit without weakening the received signal received by the receiving circuit simply by employing a small-scale passive element circuit comprising passive elements in addition to the components of the aforesaid prior art input/output device to eliminate the first drawback of the prior art input/output device.

A second object of the present invention is to provide an input/output device comprising a transmitting circuit and a receiving circuit, and capable of reducing the resistances of potential dividing resistors connected to the input terminal of the receiving circuit, maintaining the matched termination of transmission lines to eliminate the second and the third drawback of the prior art input/output device.

A third object of the present invention is to provide an input/output device comprising a transmitting circuit and a receiving circuit, and capable of reducing data screw, i.e., variation of data propagation delay, the most significant factor limiting the transmission rate of the prior art input/output device in high-speed parallel transmission and of further enhanced high-speed signal transmission to eliminate the drawbacks of the prior art input/output device.

With the foregoing object in view, the present invention provides an input/output device comprising: a transmitting circuit having a first and a second terminal through which differential signals are transmitted; a resistance circuit provided with six terminals including a first and a second terminal connected to the first and the second output terminal, respectively, of the transmitting circuit, a third and a fourth terminal connected to a first and a second transmission line, respectively; a passive element circuit capable of receiving signals that appear on a fifth and a sixth terminal of the resistance circuit and combined with the resistance circuit to form at least either a low-pass filter or an equalizing filter; and a receiving circuit provided with an inverting input terminal and a noninverting input terminal connected to the first and the second output terminal, respectively, of the passive element circuit.

The resistance circuit, similarly to that of the prior art input/output device, superposes a differential signal provided on the transmission line by the transmitting circuit and a differential signal provided by the other input/output device to provide a combined signal, separates the differential signal provided by the transmitting circuit of the input/output device from the combined signal to extract at least part of the differential signal provided by the other input/output device.

The passive element circuit employed in the present invention serves as an input component for the resistance circuit and the receiving circuit, and forms a low-pass filter for filtering noise in the differential signal extracted for application to the input terminal of the receiving circuit or an equalizing filter for compensating the frequency characteristic of the transmission line, in combination with the resistance circuit and the input component of the receiving circuit. An active filter may be formed by using an active element circuit comprising active element instead of the passive element circuit. The frequency characteristic of the filter consisting of the resistance circuit and the passive element circuit, connected with the path from the transmission line to the receiving circuit and that of the same connected with the path from the transmitting circuit to the receiving circuit are different from each other. Therefore, the filter is able to reduce effectively only the pulse noise that sneaks from the transmitting circuit to the receiving circuit without weakening the received signal.

The resistance circuit comprises a first resistor connected across the first and the third terminal, a second resistor connected across the second and the fourth terminal, a third resistor connected across the first and the sixth terminal, a fourth resistor connected across the second and the fifth terminal, a fifth resistor connected across the third and the fifth terminal, and a sixth resistor connected across the fourth and the sixth terminal, and the respective resistances $R_1$, $R_1$, $R_2$, $R_2$, $R_3$ and $R_3$ of the resistors are determined so as to meet the following relations approximately.

$$\Gamma_2 = (2\Gamma_1 + 1)\Gamma_3 + \Gamma_1 \tag{1}$$

$$\Gamma_3 = \{\tfrac{1}{2}(\Gamma_1+1)\}\{(2\Gamma_s+\Gamma_1-\Gamma_s\Gamma_1)/(\Gamma_s+2\Gamma_1-1)-1\} \tag{2}$$

$$(1-\Gamma_s)/2 < \Gamma_1 \leq 1 \tag{3}$$

$$\Gamma_s = R_s/Z_0,\ \Gamma_1 = R_1/Z_0,\ \Gamma_2 = R_2/Z_0,\ \Gamma_3 = R_3/Z_0 \tag{4}$$

where $Z_0$ is the characteristic impedance of the transmission lines and Rs is the output resistance of the transmitting circuit. Expression (1) defines conditions for cancelling part of the output of the transmitting circuit that sneaks into the receiving circuit, expression (2) defines conditions for matching the input/output device and the transmission line, and expression (3) defines a value that exists as a resistor.

When a sending signal is given to the input/output device of the present invention, a combined signal of the output of the transmitting circuit and the output of the other input/output device is produced on the transmission line. At least part of a signal transmitted by the other input/output device is extracted from the combined signal, and the receiving circuit provides a received signal. The passive element circuit of the input/output device of the present invention forms a filter together with the resistance circuit and the input component of the receiving circuit. This filter serves as a low-pass filter having a low cutout frequency in connection with the path from the output terminal of the transmitting circuit to the input terminal of the receiving circuit and, on the other hand, serves as a filter having a high cutout frequency in connection with the path from the transmission line to the input terminal of the receiving circuit. Therefore, only the pulse noise that sneaks from the transmitting circuit can be reduced without weakening the received signal.

The resistance circuit of the input/output device of the present invention comprises the resistors approximately meeting expressions (1) to (4), and the resistance circuit and the output resistance of the transmitting circuit act for matched termination. Therefore, the resistances of the potential dividing resistors can be optionally determined; that is, a sufficiently large current can be supplied to the input component of the receiving circuit to prevent the dulling of the waveform of the received signal when the capacitance of the input component of the receiving circuit is large, by connecting potential dividing resistors having small resistances $R_1$ and $R_2$ to the input terminal of the receiving circuit. When the resistances $R_2$ and $R_3$ of the potential dividing resistors are small, the reduction of the noise margin or the enhancement of jitter attributable to the protective circuit for the input component of the receiving circuit can be avoided even if a commercial standard receiving circuit RS-422 or the like is employed.

Reduction of the current flowing through the transmission line to reduce the difference between the current flowing through the transmission line and a current that flows through the potential dividing resistors is one of the means for suppressing the variation transmission amplitude due to the combination of sending signals given to the input/output devices, which can be most simply achieved by increasing the resistance $R_1$ of the matching termination resistor. Then, the resistances $R_2$ and $R_3$ of the potential dividing resistors are determined by expressions (1) to (4), the variation of the current that flows through the output component of the transmitting circuit is suppressed and the amplitude can be kept constant.

When sending signal are applied at a high rate simultaneously to a pair of input/output devices of the present invention eliminating the drawbacks of the prior art input/output device, the sending signal are transmitted through the transmission line and are provided simultaneously by the receiving input/output devices. If the transmission line is broken or the output resistance of the receiving input/output device is a high impedance, the sending signal is reflected totally at the broken position of the transmission line or by the receiving input/output device and is received as a received signal by the transmitting input/output device. Propagation delay skew on the transmission line can be determined on the basis of this received signal.

DETAILED DESCRIPTION OF THE PREFERRED EMBODIMENTS

Preferred embodiments of the present invention will be described hereinafter with reference to the accompanying drawings, in which adscripts a and b to reference numerals indicate a first and a second input/output device connected by a transmission line, respectively, and the adscripts a and b are omitted when the first and the second input/output devices are described indiscriminately.

First Embodiment

Figure 1:
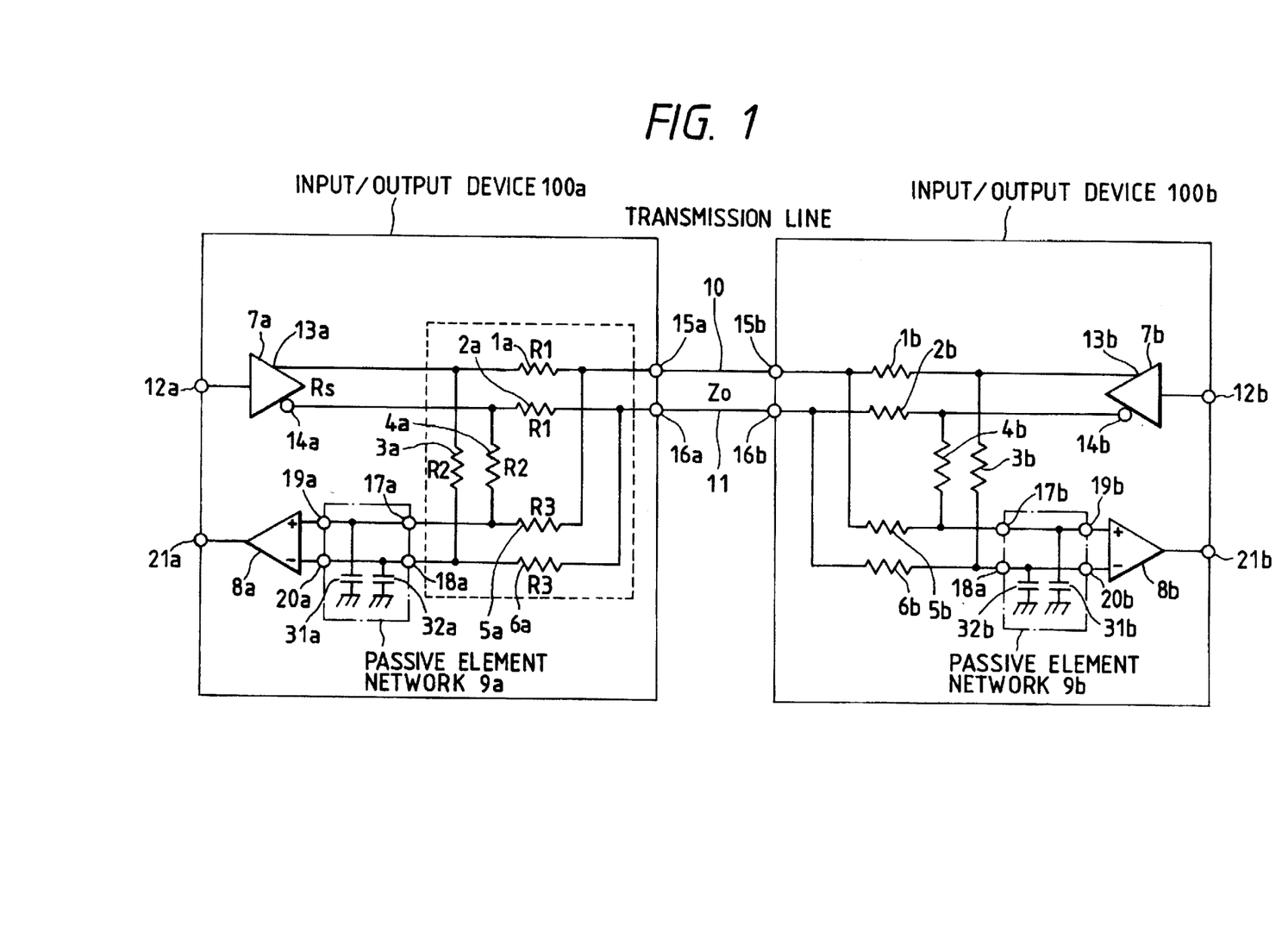
FIG. 1 is a circuit diagram of an input/output device in a first embodiment according to the present invention.

FIG. 1 is a circuit diagram of a simultaneous bidirectional transmission apparatus comprising two input/output devices in a first embodiment according to the present invention, i.e., a first input/output device 100a and a second input/output device 100b. Shown in FIG. 1 are input/output devices 100, first resistors 1, second resistors 2, third resistors 3, fourth resistors 4, fifth resistors 5 and sixth resistors 6. The first resistors 1 and the second resistors 2 are matching termination resistors, the third resistors 3 and the sixth resistors 6 are first potential dividing resistors, the fourth resistors 4 and the fifth resistors 5 are second potential dividing resistors, and the resistors 1, 2, 3, 4, 5 and 6 form resistance circuits. Shown also in FIG. 1 are transmitting circuits 7 that provide differential signals representing sending signals, receiving circuits 8 that receive differential signals and provide corresponding received signals, passive element circuits 9, transmission lines 10 and 11, input terminals 12 through which sending signals are applied to the transmitting circuits 7, first output terminals 13 and second output terminals 14 of the transmitting circuits 7, first output terminals 15 and second output terminals 16 connecting the resistance circuits to the transmission lines 10 and 11, respectively, terminals 17 and 18 connecting the resistance circuits to the passive element circuits 9, respectively, inverting input terminals 19 and noninverting input terminals 20 of the receiving circuits 8, and output terminals 21 through which the receiving circuits 8 provide received signals. In FIG. 1, $R_1$, $R_2$ and $R_3$ are resistances of the resistors 1 to 6, $Z_0$ is characteristic impedance between the transmission lines 10 and 11, Rs is the output resistance of the transmitting circuit 7.

Figure 2:
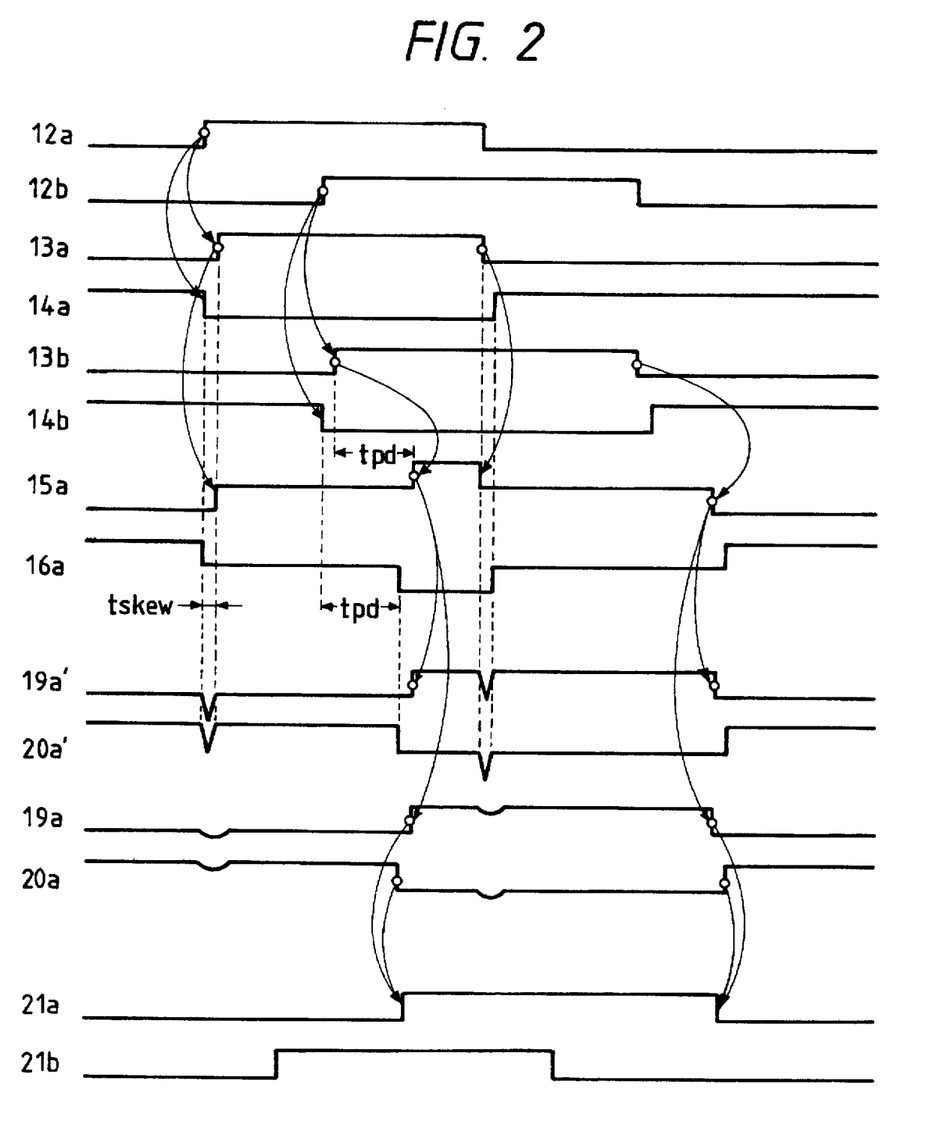
FIG. 2 is a timing diagram of assistance in explaining the operation of the input/output device of FIG. 1.

FIG. 2 is a timing chart of assistance in explaining the operation of the simultaneous bidirectional transmission apparatus of FIG. 1, in which waveform numbers indicating signals correspond to the reference characters designating the components through which the signals indicated by the same waveform numbers are transferred, respectively. In FIG. 2, signals that appear on the inverting terminal 19a and the noninverting terminal 20a when the passive element circuit 9a is omitted are indicated at 29a' and 20a', tpd indicates propagation delay on the transmission lines 10 and 11, tskew indicates data skew between the output terminals 13 and 14 of the transmitting circuit 7.

The impedances of the transmission lines 10 and 11 are matched for termination by the combination of the resistors 1 to 6 of the resistance circuits of the input/output devices 100a and 100b, and the output resistances Rs of the transmitting circuits 7. The operation of the simultaneous bidirectional transmission apparatus will be described in connection principally with the first input/output device 100a. When sending signals are applied to the terminals 12, differential potentials of ternary value logic formed by combining the differential outputs of the input/output devices 100a and 100b appear on the terminals 15 and 16. This state is expressed by the waveforms 12a, 12b, 13a, 13b, 14a, 14b, 15a and 16a in FIG. 2. Upon transmission, the contribution of the transmitted signal of the first input/output device 100a is subtracted from the combined differential signals of ternary value logic to extract the differential signals transmitted by the second input/output device 100b on the inverting terminal 19a and the noninverting terminal 20a, and the receiving circuit 8a provides output data on the output terminal 21a. The transmitting circuit 7a must apply the median of the potentials of the output terminals 13a and 14a to the inverting input terminal 19a and the noninverting input terminal 20a regardless of the potentials of the output terminals 13a and 14a to determine the input to the receiving circuit 8a regardless of the output from the transmitting circuit 7a. In such a state, the potentials of the terminals 17a and 18a are equal to the sums of the potentials of received signals received through the transmission lines 10 and 11 and resistors 1a and 6a from the second input/output device 100b, and the median potentials of the output terminals 13a and 14a. Since the output terminals 13a and 14a are complementary to each other both when the input terminal 12a of the transmitting circuit 7a is HIGH and when LOW, the potential of the latter median potential always remains constant. Therefore, input to the receiving circuit 8a is uniquely dependent only on the former received signal. The median potential between the output 13a and the output 14a must be kept constant by changing the output 14a by $-\Delta V$ when the output 13a changes by $\Delta V$, to carry out the foregoing operation in an ideal mode. Otherwise, the signals that appear on the inverting input terminal 19a and the noninverting input terminal 20a are affected. Generally, there is a skew between the outputs 13a and 14a when the outputs 13a and 14a are inverted, and the time required for the output 13a to change and the time required for the output 14a to change are not exactly equal to each other. Therefore, every time the outputs 13a and 14a of the transmitting circuit 7a are inverted, pulse noise is generated in a signal received through the transmission lines 10 and 11 from the second input/output device 100b. Such a state is expressed by waveforms 13a, 14a, 19a' and 20a' in FIG. 2. The frequency of the pulse noise is dependent on the inverting speeds of the outputs 13a and 14a, and, generally, the frequency of the pulse noise is one figure higher than that of the transmitted signals.

The passive element circuit 9a is connected to the terminals 17a and 18a to suppress the pulse noise. The passive element circuit 9a has capacitors 31a and 32a interposed between the terminals 17a and 18a, and a ground, respectively. The resistors 1a to 6a of the resistance circuit and the capacitors 31a and 32a form a low-pass filter. Since the resistances of paths between the transmitting circuit 7a and the receiving circuit 8a are greater than the resistances of the paths between the transmission lines 10 and 11 and the receiving circuit 8a, the low-pass filter has a low cutoff frequency for the path of the pulse noise and a high cutoff frequency for the received signal. Thus, the low-pass filter reduces the pulse noise without weakening the received signal to enable the receiving circuit 8a to apply the received signal with sufficient noise margin to the output terminal 21a. This state is expressed by the waveforms 19a, 20a, 21a and 21b.

It is desirable that the respective resistances of the matching termination resistors 1 and 2 are equal to each other, the respective resistances of the potential dividing resistors 3 and 4 are equal to each other and the respective resistances of the resistors 5 and 6 are equal to each other to carry out the foregoing operation accurately with sufficient noise margin. It is also desirable that the resistances $R_1$ of the resistors 1 and 2, the resistances $R_2$ of the resistors 3 and 4, the resistances $R_3$ of the resistors 5 and 6, the characteristic impedance $Z_0$ of the transmission lines 10 and 11 and the output resistance Rs of the transmitting circuit 7 approximately meet expressions (1) to (4). When expressions (1) to (4) are satisfied, the resistors 1 to 6 of the resistance circuit act in combination with the output resistance Rs of the transmitting circuit 7 for the matched termination of the transmission lines 10 and 11, and prevents the sneak of the output of the transmitting circuit 7a into the input of the receiving circuit 8a. When determining the resistances, it is preferable that the resistances $R_1$ of the matching termination resistors are moderately large, and the resistances $R_2$ and $R_3$ of the potential dividing resistors are slightly greater than the resistances $R_1$. Such resistances enables the application of sufficient currents to the input terminals 19 and 20 of the receiving circuit 8, prevents the dulling of the waveforms of the received signals due to the parasitic capacitance and enables high-speed transmission.

Concretely, when $Z_0=100\Omega$ and $Rs=30\Omega$, $R_1=47\Omega$, $R_2=270\Omega$ and $R_3=120\Omega$ are desirable. The transmitting circuit 7 and the receiving circuit 8 may be, for example, a differential line driver IC and a differential line receiver IC of the standard RS-422, respectively. When such standard ICs are employed, the time necessary for the inversion o the transmitting circuit 7 is about 1 ns, and the frequency of the pulse noise that appears on the input terminals 19 and 20 are about 300 MHz or above when the passive element circuit 9 is omitted. When the capacitances of the capacitors 31 and 32 of the passive element circuit 9 are 10 pF, the cutoff frequency is about 80 MHz for the path of the pulse noise, and the cutoff frequency is about 200 MHz for the path of the received signal. If signals are transmitted at a transmission rate of 10 Mbps, which is the transmission rate of the current high-seed transmission network, the pulse noise can be reduced without weakening the received signal.

Figure 3:
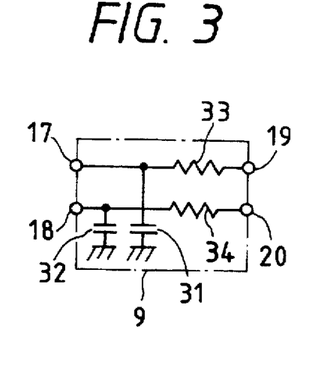
FIG. 3 is a circuit diagram of a passive element circuit in a first modification of a passive element circuit 9 included in the input/output device of FIG. 1.
Figure 4:
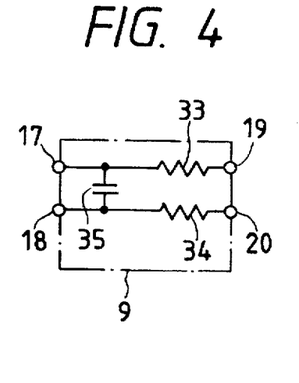
FIG. 4 is a circuit diagram of a passive element circuit in a second modification of a passive element circuit 9 included in the input/output device of FIG. 1.
Figure 5:
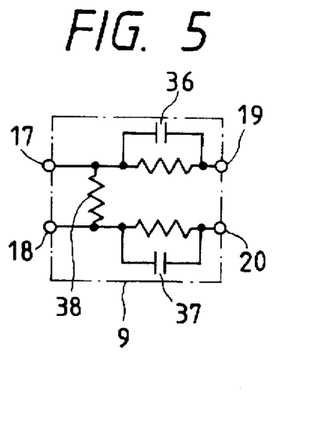
FIG. 5 is a circuit diagram of a passive element circuit in a third modification of a passive element circuit 9 included in the input/output device of FIG. 1.

FIGS. 3, 4 and 5 shows modifications of the passive element circuit 9.

A passive element circuit 9 shown in FIG. 3 is provided with resistors 33 and 34 respectively connected to terminals 19 and 20. The resistances of the resistors 1 to 6 of the resistance circuit, and the parasitic capacitances of the passive element circuit 9, the inverting input terminal 19 and the noninverting input terminal 20 form a secondary low-pass filter in combination, which enables further effective pulse noise reduction.

A passive element circuit 9 shown in FIG. 4 does not have any capacitors corresponding to the capacitors 31 and 32 of the passive element circuit 9 of FIG. 1 and is provided with a capacitor 35 interconnecting lines to form a secondary low-pass filter. If the parasitic capacitance between the lines is used as the capacitor 35, the number of parts, the costs and the packaging area can be further reduced. If the opposite ends of a resistor 33 and the opposite ends of a resistor 34 are sort-circuited, a primary low-pass filter having the same advantages can be formed. When the capacitor 35 is interposed between the lines as shown in FIG. 4, the low-pass filter does not act on pulse components of the same phase and reduces only differential pulse components.

A passive element circuit 9 shown in FIG. 5 has resistors 33 and 34, capacitors 36 and 37 connected in parallel respectively to the resistors 33 and 34, and a resistor 38 interconnecting lines to form a simple equalizer. This configuration compensates the frequency losses of the transmission lines 10 and 11.

Any one of the passive element circuits 9a shown in FIGS. 3, 4 and 5 may be connected to the terminals 19a and 20a of the receiving circuit 8a, because the transmitted signals on the output terminals 13a and 14a of the transmitting circuit 7a do not produce any potential difference between the 17a and 18a and hence the sneak of the signal does not occur even if some circuit is connected to the terminals 17a and 18a.

Figure 6:
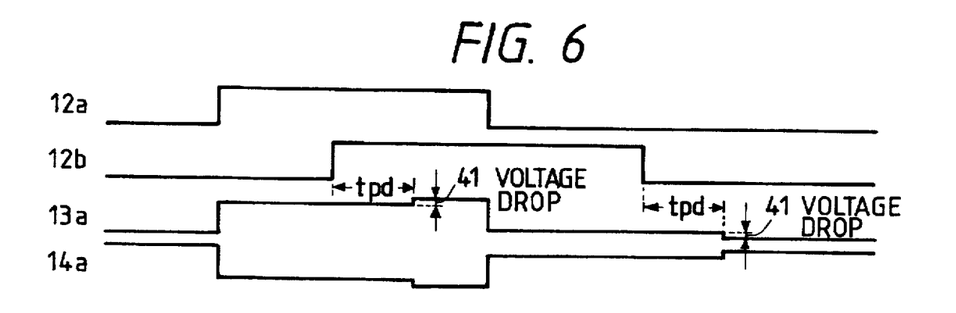
FIG. 6 is a part of the timing diagram of FIG. 2.

FIG. 6 shows part of the time chart of FIG. 2, for the detailed description of voltage drop due to the output resistance Rs of the transmitting circuit 7. In FIG. 6, indicated at 41 is a voltage drop in the output of the transmitting circuit 7.

Referring to FIG. 6, there has been a problem that the amplitudes of the differential outputs of the transmitting circuits 7 are caused to change by the combination of the sending signals given to the input/output devices 100a and 100b connected to the opposite ends of the transmission lines 10 and 11 due to voltage drops caused by the output resistances Rs of the transmitting circuits 7. When the combination of the sending signals applied to the input terminals 12a and 12b is a combination of HIGH and HIGH or a combination of LOW and LOW, there is no potential difference between the opposite ends of the transmission lines 10 and 11 and hence no current flows through the transmission lines 10 and 11. Consequently, small output currents flow through the output terminals 13 and 14 of the transmitting circuits 7 and, therefore, the voltage drop 41 due to the output resistance Rs is small and the amplitude of the output is large. When the combination of the sending signals applied to the terminals 12a and 12b is a combination of HIGH and LOW or a combination of LOW and HIGH, a large currents flow through the transmission lines 10 and 11. Consequently, large output currents flows through the output terminals 13 and 14 of the transmitting circuits 7 and, therefore, the voltage drop 41 due to the output resistance Rs is large and the amplitude of the output is small.

It is desirable that the resistance $R_1$ of the matching termination resistors 1 and 2 is large, the resistances $R_2$ and $R_3$ of the potential dividing resistors are relatively small to meet expressions (1) to (4), and currents that flows through the transmission lines 10 and 11 are small when the combination is a combination of HIGH and LOW or a combination of LOW and HIGH to reduce the voltage drop 41. When such conditions are satisfied, the variations of the output currents of the transmitting circuits 7 attributable to the change of the combination of sending signals can be reduced, whereby the output currents of the transmitting circuits 7 can be easily kept substantially constant without changing circuit configuration; that is, the effect of the voltage drop 41 can be suppressed and the amplitudes of the outputs of the transmitting circuits 7 can be kept constant.

Second Embodiment

Figure 7:
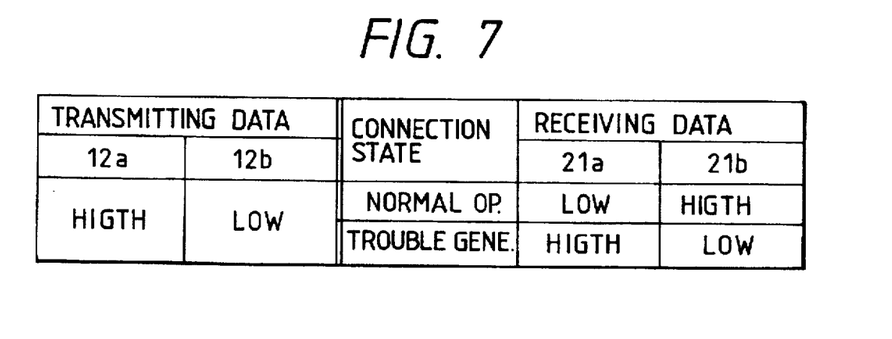
FIG. 7 is a truth table of assistance in explaining the operation of an input/output device in a second embodiment according to the present invention, showing a transmission procedure.
Figure 8:
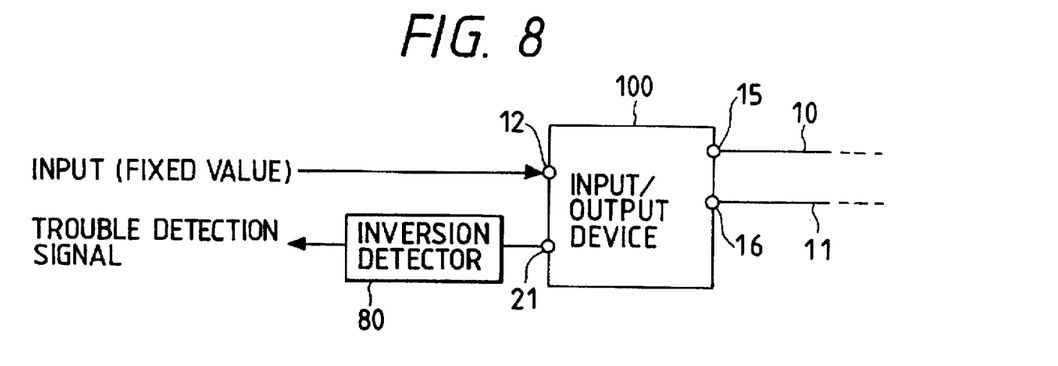
FIG. 8 is a block diagram of the input/output device in the second embodiment.

FIG. 7 is a truth table of assistance in explaining the operation of an input/output device in a second embodiment according to the present invention and FIG. 8 is a block diagram of the input/output device in the second embodiment. This input/output device has an abnormal connection detecting function.

Referring to FIG. 7, a sending signal 12a of HIGH and a sending signal 12b of LOW are given to input/output devices 100a and 100b, respectively. When the input/output devices 100a and 100b are connected normally and are in normal operation, the first input/output device 100a receives a received signal 21a of LOW from the second input/output device 100b, and the second input/output device 100b receives a received signal 21b of HIGH from the first input/output device 100a. When the connection of the input/output devices 100a and 100b becomes abnormal or a trouble, such as increase in the impedance of the transmitting circuit 7b of the second input/output device 100b due to the disconnection of the second input/output device 100b from the power supply, occurs, the received signal 21a received by the first input/output device 100a is inverted and goes HIGH and the received signal 21b received by the second input/output device 100b is inverted and goes LOW, because the sneak from the transmitting circuit 7 into the receiving circuit 8 cannot be cancelled unless the matched transmission lines 10 and 11 are connected to the terminals 15 and 16.

Referring to FIG. 8, the input/output device 100 has an inversion detector 80 for detecting the inversion of the signal sent out through an output terminal 21. Input signal of a fixed level is applied to an input terminal 12. As mentioned above, input data of different levels are applied to the input terminals 12a and 12b of the input/output devices 100a and 100a connected to the opposite ends of the transmission lines 10 and 11, respectively. When a trouble occurs, the levels of the received data received by the input/output devices 100a and 100b are inverted, and then the inversion detectors 80 provide trouble detection signals. When one of the circuits of a parallel transmission apparatus or the like having a plurality of input/output devices is provided with the inversion detector 80 of FIG. 8, any additional input/output device to incorporate the abnormal connection detecting function to the parallel transmission apparatus is not necessary.

Third Embodiment

Figure 9:
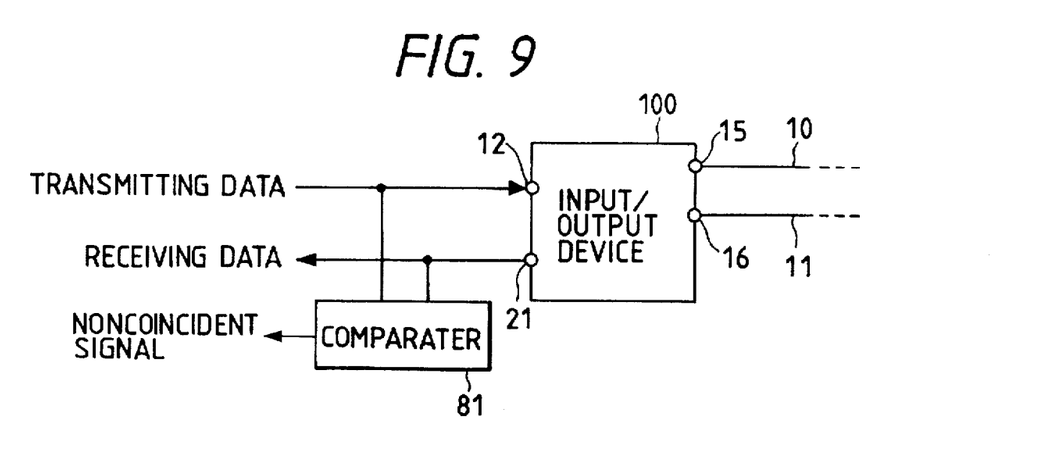
FIG. 9 is block diagram of an input/output device in a third embodiment according to the present invention.

FIG. 9 is a block diagram of an input/output device in a third embodiment according to the present invention. This input/output device 100a (100b) has a self-inspecting function to inspect itself to see whether or not the input/output device 100a (100b) operates normally during a start-up period after the connection of the input/output device 100a (100b) without exchanging signals between the input/output devices 100a and 100b or without connecting transmission lines 10 and 11. In FIG. 9, indicated at 81 is a comparator which compares a sending signal and a received signal, and provides a noncoincidence signal when the sending signal and the received signal do not coincide with each other.

When the transmission line 10 or 11 is not connected to the first input/output device 100a or when the second input/output device 100b is disconnected from the power supply or the transmitting circuit 7b of the second input/output device 100b is a three-state transmitting circuit in an enable-off state, the first input/output device 100a receives a signal transmitted by its transmitting circuit 7a by its receiving circuit 8a for the reason explained in connection with the second embodiment when the second input/output device 100b is in a high-impedance state. A comparator 81 compares the sending signal and the received signal to find out whether or not the sending signal 12a given to the transmitting circuit 7a and the received signal 21a provided by the receiving circuit 8a coincide with each other. Thus, the first input/output device 100a is able to confirm its normal condition without exchanging signals with the second input/output device 100b.

Fourth Embodiment

Figure 10:
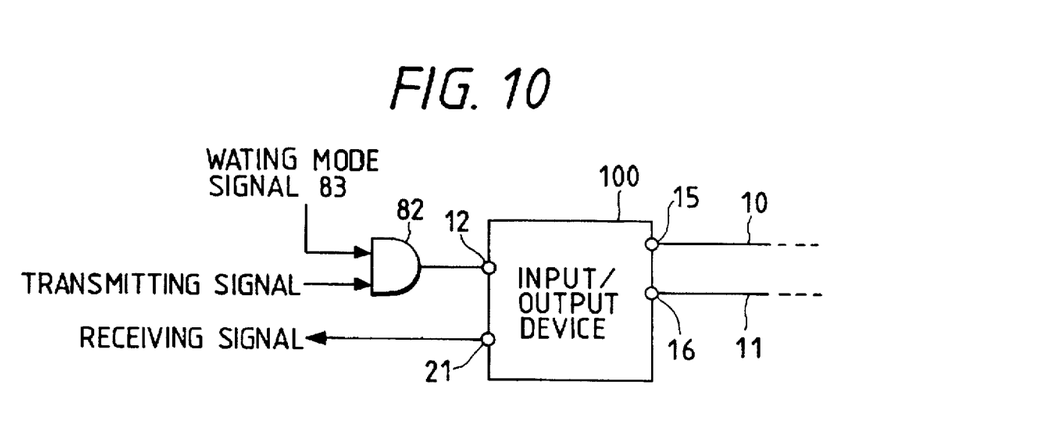
FIG. 10 is a block diagram of an input/output device in a fourth embodiment according to the present invention.

FIG. 10 is a block diagram of an input/output device in a fourth embodiment according to the present invention. This input/output device has a low-power-consumption standby function to reduce power consumption in a standby mode in which no data is transmitted or received. As shown in FIG. 10, the input/output device 100 is provided with an AND circuit 82 that applies an AND signal, i.e., the logical product of a standby mode signal 82 and a sending signal, to an input terminal 12. The standby mode signal 82 is HIGH during a signal send/receive mode and is LOW in a standby mode.

In the signal send/receive mode, the AND circuit 82 applies the sending signal to the input terminal 12. In the standby mode, where the standby mode signal is LOW, the input terminal 12 is held necessarily at LOW. If the other input/output device also is in the standby mode, the sending signals go LOW; consequently, no current flows through the transmission lines 10 and 11, and the currents supplied to the input/output devices 100 decreases to a minimum, so that power consumption is reduced. The same function can be realized by holding both the input terminals are held at HIGH. Even if the input terminals 12 are not held at a fixed level, power consumption can be greatly reduced by using signal sending means that send signals of the same level.

Although the preferred embodiments of the present invention have been described, the present invention is not limited thereto in its practical application.

Thus, the present invention solves problems in the conventional bidirectional transmission apparatus comprising the input/output devices and the transmission lines interconnecting the input/output devices particularly when the bidirectional transmission apparatus is used for high-speed signal transmission by simple means.

First, the pulse noise generated in the receiving circuit due to the inversion of the sending circuit can be efficiently reduced without weakening the received signal by the passive element circuit of the single capacitor, which provides very high cost effect. The present invention is also capable of compensating the frequency loss in the transmission lines.

Secondly, since the resistance circuit and the output resistance of the output circuit cooperate for the matched termination of the transmission lines, optimum resistances of the component resistors can be selected out of those in a wide range of resistance. For example, when the receiving circuit has a large input capacity, the dulling of the waveform of the received signal beyond a degree to which the waveform is dulled by the effect of the frequency loss in the transmission lines can be prevented and, at the same time, the noise margin will not be reduced and jitter will not be enhanced even if a commercial, standard receiving IC having an input component with a built-in protective circuit is employed.

Thirdly, the resistances of the matching termination resistors can be optionally increased to maintain the amplitudes of outputs of the transmission circuits substantially constant, whereas the amplitudes of the outputs of the transmitting circuits of the conventional input/output devices vary according to the combination of the input signals received by the receiving circuits. This effect in maintaining the amplitudes of the outputs of the transmitting circuits substantially constant and the aforesaid effect in preventing the dulling of the waveforms of the received signals can be simultaneously exerted.

As is apparent from the foregoing description, the present invention eliminates the drawbacks of the prior art and enables high-speed simultaneous bidirectional transmission and realizes convenient functions, such as a trouble detecting function, a self-inspecting function to determine whether or not the input/output device is normal without communicating with the other input/output device, and a low-power-consumption standby function, which cannot be realized by the prior art simultaneous bidirectional transmission apparatus and the general unilateral transmission lines.

What is claimed is:

1. An input/output device comprising:
an input/output device comprising:
a transmitting circuit having a first and a second output terminal through which differential signals are sent out;
a resistance circuit comprising a first, a second, a third, a fourth, a fifth and a sixth terminal, the first and the second terminal being connected to the first and the second output terminal of the transmitting circuit, respectively, the third and the fourth terminal being connected to a first and a second transmission line, respectively;
a passive element circuit that receive signals applied to the fifth and the sixth terminal of the resistance circuit, and forms either a low-pass filter or an equalizing filter together with the resistance circuit; and
a receiving circuit having a noninverting terminal and an inverting terminal connected to the first and the second output terminal, respectively, of the passive element circuit;
wherein the resistance circuit comprises a first resistor connected across the first and the third terminal; a second resistor connected across the second and the fourth terminal, a third resistor connected across the first and the sixth terminal, a fourth resistor and connected across the second and the fifth terminal, a fifth resistor connected across the third and the fifth terminal, and a sixth resistor connected across the fourth and the sixth terminal; said first to sixth resistors respectively having resistances $R_1$, $R_1$, $R_2$, $R_2$, $R_3$ and $R_3$; and the resistances $R_1$, $R_2$ and $R_3$ approximately meet the following expressions:

$$\Gamma_2 = (2\Gamma_1 + 1)\Gamma_3 + \Gamma_1 \tag{1}$$

$$\Gamma_3 = \{\frac{1}{2}(\Gamma_1+1)\}\{(2\Gamma_s+\Gamma_1-\Gamma_s\Gamma_1)/(\Gamma_s+2\Gamma_1-1)-1\} \tag{2}$$

$$(1-\Gamma_s)/2 < \Gamma_1 \leq 1 \tag{3}$$

$$\Gamma_s = R_s/Z_0, \ \Gamma_1 = R_1/Z_0, \ \Gamma_2 = R_2/Z_0, \ \Gamma_3 = R_3/Z_0 \tag{4}$$

where $Z_0$ is the characteristic impedance of the transmission lines, and Rs is the output resistance of the transmitting circuit.

2. An input/output device according to claim 1, wherein the passive element circuit comprises resistors and capacitors.

3. An input/output device according to claim 2, wherein the passive element circuit further comprises a capacitor connected across the fifth terminal of the resistance circuit and the ground of the receiving circuit, and a capacitor connected across the sixth terminal of the resistance circuit and the ground of the receiving circuit.

4. An input/output device according to claim 1, wherein the output component of the receiving circuit has an inversion detecting means for detecting the inversion of the received signal and providing an inversion detection signal.

5. An input/output device according to claim 1, further comprising a comparing means for comparing a sending signal given to the transmitting circuit and a received signal provided by the receiving circuit.

6. A simultaneous bidirectional transmission apparatus comprising at least one set of input/output devices interconnected by a first and a second transmission line, each of said input/output devices comprising:
a transmitting circuit having a first and a second output terminal through which differential signals are sent out;
a resistance circuit comprising a first, a second, a third, a fourth, a fifth and a sixth terminal, the first and the second terminal being connected to the first and the second output terminal of the transmitting circuit, respectively, the third and the fourth terminal being connected to a first and a second transmission line, respectively;
a passive element circuit that receive signals applied to the fifth and the sixth terminal of the resistance circuit, and forms either a low-pass filter or an equalizing filter together with the resistance circuit; and a receiving circuit having a noninverting terminal and an inverting terminal connected to the first and the second output terminal, respectively, of the passive element circuit;

wherein the resistance circuit of each input/output device comprises a first resistor and connected across the first and the third terminal; a second resistor connected across the second and the fourth terminal, a third resistor and connected across the first and the sixth terminal, a fourth resistor connected across the second and the fifth terminal, a fifth resistor connected across the third and the fifth terminal, and a sixth resistor connected across the fourth and the sixth terminal; said first to sixth resistors respectively having resistances $R_1$, $R_1$, $R_2$, $R_2$, $R_3$ and $R_3$; and the resistances $R_1$, $R_2$ and $R_3$ approximately meet the following expressions:

$$\Gamma_2 = (2\Gamma_1 + 1)\Gamma_3 + \Gamma_1 \qquad (1)$$

$$\Gamma_3 = \{\tfrac{1}{2}(\Gamma_1+1)\}\{(2\Gamma_s+\Gamma_1-\Gamma_s\Gamma_1)/(\Gamma_s+2\Gamma_1-1)-1\} \qquad (2)$$

$$(1-\Gamma_s)/2 < \Gamma_1 \leq 1 \qquad (3)$$

$$\Gamma_s = R_s/Z_0, \ \Gamma_1 = R_1/Z_0, \ \Gamma_2 = R_2/Z_0, \ \Gamma_3 = R_3/Z_0 \qquad (4)$$

where $Z_0$ is the characteristic impedance of the transmission lines, and Rs is the output resistance of the transmitting circuit.

7. A simultaneous bidirectional transmission apparatus according to claim 6, wherein the passive element circuit of each input/output device comprises resistors and capacitors.

8. A simultaneous bidirectional transmission apparatus according to claim 7, wherein the passive element circuit of each input/output device further comprises a first capacitor connected across the fifth terminal of the resistance circuit and the ground of the receiving circuit, and a second capacitor connected across the sixth terminal of the resistance circuit and the ground of the receiving circuit.

9. A simultaneous bidirectional transmission apparatus according to claim 6, wherein the input/output devices are provided with fixing means for fixing their sending signals on the level of the sending signal of the other associated input/output device.

* * * * *